Feb. 18, 1958  H. W. ALTMAN  2,823,822
VACUUM BOTTLE
Filed Oct. 10, 1955

INVENTOR:
Howard W. Altman,
BY
Bair, Freeman & Molinare
ATTORNEYS.

United States Patent Office 2,823,822
Patented Feb. 18, 1958

2,823,822

VACUUM BOTTLE

Howard W. Altman, Columbus, Ohio, assignor to The Aro Equipment Corporation, Bryan, Ohio, a corporation of Ohio Application October 10, 1955, Serial No. 539,521

2 Claims. (Cl. 220—15)

This invention relates to a double-walled vacuum bottle having an evacuated space between the walls to provide thermal insulation for the contents of the container. More particularly, the invention relates to an insulating container for liquid oxygen and to a novel means for suspending the inner shell within the outer shell of the container. Liquid oxygen containers of this type are frequently used in aircraft and, consequently, the containers must be designed to resist metal fatigue due to vibration. Metal fatigue failures are particularly troublesome at the temperature of liquid oxygen due to carbide precipitation of the grain boundaries. Therefore, it is important that the means for mounting the inner shell within the outer shell be adapted to minimize any failure of the container due to fatigue from vibration and, of course, it is also essential that the mounting connection transmit as little heat as possible from the atmosphere to the inner shell of the container which holds the liquid oxygen. The temperature gradient between the liquid oxygen at −297° F. and ambient temperature at, say, 70° F. will result in considerable heat transfer to the liquid unless the inner container is effectively insulated from the outer shell.

It is a general object of this invention to provide a vacuum-type bottle or container having an inner shell and an outer shell with an evacuated space between, the inner shell being suspended from the outer shell at the top and resiliently retained by means of a thermal insulating connection at the bottom.

Another object is to provide a vibration-resistant vacuum bottle resembling a Florence flask in shape having inner and outer shells and a neck extending from the spherical portion, the neck on the inner shell being secured to the neck of the outer shell by means of an annular spacer ring mounted in the outer end of the neck, and a vibration dampener mounted in thermal insulating relation with the outer shell opposite said neck and adapted to cooperate with a stud extending outwardly from the inner shell to prevent pendulum motion of the inner shell.

Another object is to provide a bottle of the type described having a resilient support at the lower pole of the spherical portion of the inner shell comprising a helical clock-type spring which cooperates with a stud extending from the inner shell to provide resilient retention of the inner shell in spaced relation with the outer shell.

These and other objects and advantages will become apparent from the following description as illustrated in the accompanyings drawings, in which.

Figure 1:
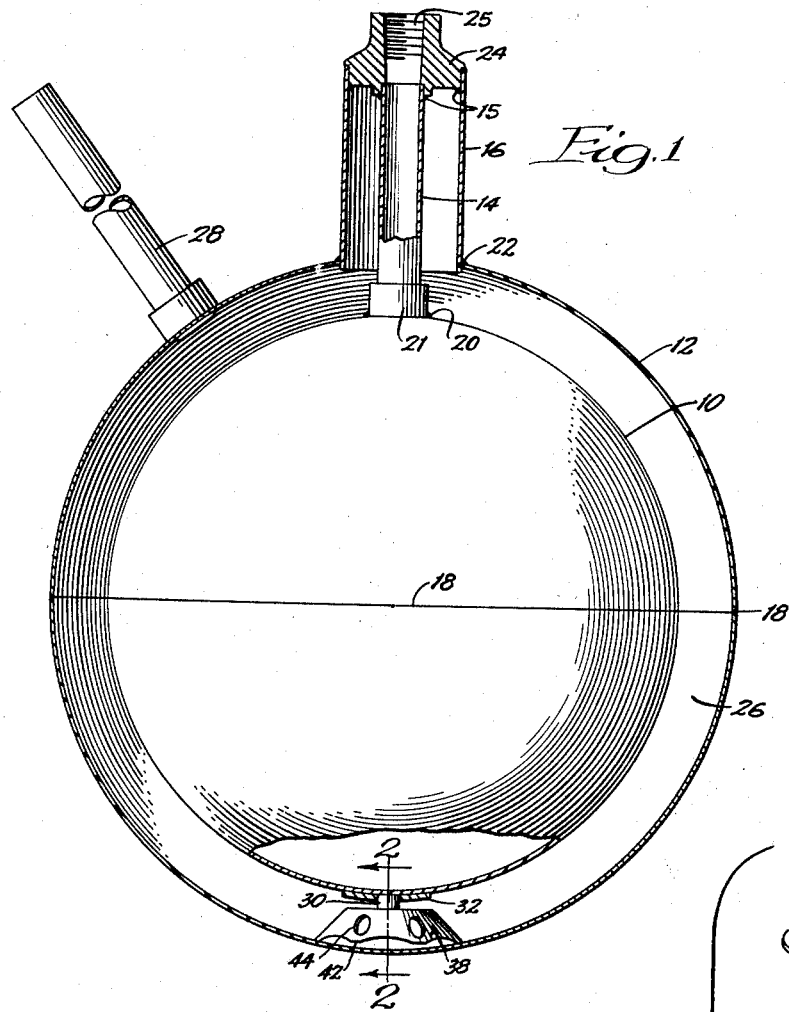
Figure 1 is an elevational view of a vacuum bottle constructed in accordance with the invention showing the outer shell in section and the inner shell partially broken away to illustrate the suspending connection between the inner and outer shells.

The bottle consists of two spaced shells 10 and 12, each being generally shaped like a laboratory Florence flask and comprising a sphere having a cylindrical neck 14, 16 projecting outwardly from the upper pole. It will be understood, of course, that although the Florence flask shape is used for purposes of illustration, the bottle may be ellipsoidal, cylindrical, or other suitable shape. The spherical portion of the shells may be fabricated from stainless steel, for example, by welding two hemispheres together with an equatorial weld, as indicated at 18. The necks 14 and 16 are similarly welded, as indicated at 20 and 22. The neck 14 may be suitably reinforced by means of an axial collar 21 which is welded at its lower edge to the upper pole of the sphere. The inner shell 10 is suspended within the outer shell, with the walls in spaced relation, by means of an annular sealing ring 24, secured to the opposed surfaces of the necks near the outer ends thereof. The neck 14 is secured to the inner surface of the ring, and the neck 16 is secured to the outer surface of the ring by circumferential welds 15, thus sealing the space 26 between the shells from the atmosphere and suspending the inner shell 10 by its neck 14, pendulum fashion, within the outer shell. The heat conductive path from the atmosphere to the inner shell may be lengthened by increasing the length of the necks, thereby providing better insulation. The ring 24 is tapped as indicated at 25 to receive a pipe connection.

A suitable tube 28 is welded to the outer shell at any convenient location and communicates with the space 26 to permit evacuation of this space. The outer end of the tube 28 is connected to a suitable source of vacuum after the container has been assembled, and the space 26 is evacuated, whereupon the tube 28 is pinched off to provide a gas-tight seal which prevents air from flowing back into the evacuated space 26. It will be noted that all sealing connections are welded. It is important that welded joints be used since they provide the very best seal for maintaining the extremely high vacuum drawn between the shells. Soldered joints may be used but are not as satisfactory from this standpoint.

Figure 2:
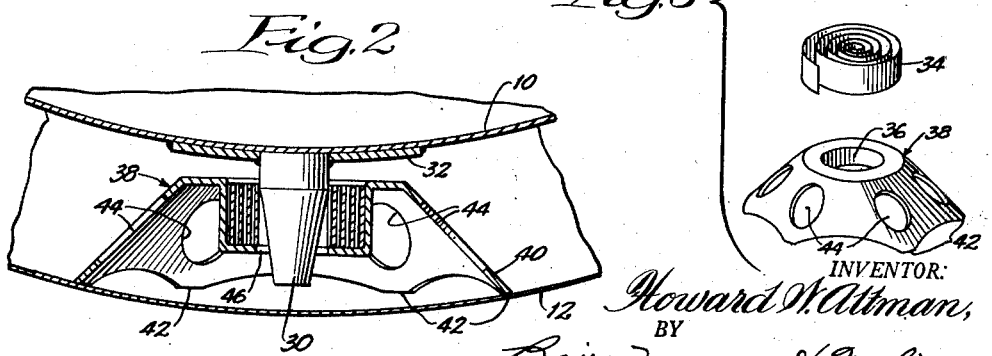
Figure 2 is a sectional view taken along the line 2—2 of Figure 1.
Figure 3:
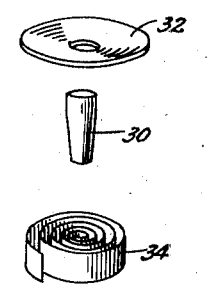
Figure 3 is an exploded view of the component parts of the vibration dampener assembly used for resiliently and insulatingly anchoring the inner shell at its lower pole.

It is apparent from the drawing that the inner shell 10 hangs from its neck 14 which is welded to the inner surface of the annular sealing ring 24. To prevent the shell 10 from swinging and becoming dislocated with respect to the outer shell 12, the lower end or pole of the inner sphere is resiliently fixed to a vibration dampener mounted in insulating relation with the outer shell. This is accomplished by providing a stud 30 which is welded to a reinforcing collar 32, which in turn is welded to the lower pole of the inner sphere. The stud is adapted to cooperate with a resilient support to prevent swinging of the inner shell from its neck. When the container is used for liquid oxygen in an aircraft, the vibration of the aircraft has a tendency to cause the metal to fatigue around the margin of the stud 30 and ultimately the inner container will fail. Metal fatigue is particularly rapid at the extremely low temperatures at which oxygen is liquid. Metal fatigue is further aggravated if the stud 30 is rigidly connected to the outer shell. Therefore, it is desirable to employ a suitable anchor for the stud which is resilient and capable of accommodating slight lateral movement of the inner sphere or shell. The vibration dampener, best illustrated in Figures 2 and 3 of the drawing, is provided for this purpose. In addition to resiliently securing the stud 30 to the outer shell, the vibration dampener is so constructed as to minimize thermal conductivity from the outer shell to the inner shell. The preferred construction for the vibration dampener comprises a spiral monoplanar clock-type spring 34, mounted in a cup-like container 36 which comprises part of the support 38. The support 38 resembles a candleholder in construction. The cup 36 has an outwardly extending flange 40 that turns downwardly to support the cup in elevated position. At its lower edge the flange 40 is scalloped so that contact is made with the inner surface of the outer shell at points 42. The support 38 may be secured to the outer shell at these points by welding. It is important that a minimum area of the support 38 contact the shell so as to reduce the size of the thermally conductive path. Conductivity is further reduced by removing metal from the support 38 by providing a plurality of circumferentially spaced holes 44 cut through the downwardly turned portion of the flange 40. The bottom of the cup 36 is provided with an opening 46 through which the end of the stud 30 extends. The spiral spring 34 rests on the bottom of the cup 36, and the inner coil of the spring lies in contact with the outer circumference of the stud. The normal heat path, therefore, is the entire length of the spring. Preferably, the stud 30 is tapered toward its outer end so that contact between the inner coil of the spring 34 and the stud is made along a line rather than over a band equal to the width of the spring. The latter would be the case if the stud were of uniform diameter along its entire length. By providing only a line contact, the possibility of conducting heat from the outer shell to the inner shell is further reduced. The spiral spring, of course, resists lateral movement of the stud resiliently to prevent dislocation of the inner sphere with respect to the outer sphere. The slight movement permitted by the spring minimizes the tendency of the metal to fail in the marginal area surrounding the lower pole of the inner sphere to which the stud is connected.

All of the parts of the vacuum bottle described are preferably made from stainless steel and are welded together to provide optimum gas impermeability as mentioned previously. It is apparent, however, that changes in materials and construction of the vacuum bottle can be made without departing from the true spirit of the invention. It is, therefore, not my intention to restrict the invention otherwise than as necessitated by the scope of the appended claims.

What I claim as new and desire to secure by Letters Patent of the United States is:

1. A vacuum bottle comprising spaced inner and outer shells, each shell having a neck extending outwardly therefrom, the neck of the inner shell being spaced from the neck of the outer shell by an annular sealing ring from which the inner shell is suspended, pendulum fashion, the space between said shells being evacuated, a tapered stud fixed to and extending from the inner shell at the bottom thereof opposite said neck, and a vibration dampener comprising a spiral monoplanar spring mounted in insulating relation with said outer shell, the inner coil of said spring embracing said stud in line contact to provide resilient retention of the inner shell in spaced relation with the outer shell.

2. A Florence flask-shaped vacuum bottle comprising spaced inner and outer spherical shells, each shell having a neck extending outwardly therefrom, the neck of the inner shell being spaced from the neck of the outer shell by an annular sealing ring circumferentially welded to opposed surfaces of said necks near the outer ends thereof, the inner shell being suspended pendulum fashion from said ring, and the space between said shells being evacuated, a stud fixed to and extending from the inner shell at the lower pole thereof opposite said neck, a collar surrounding said stud to reinforce the inner shell in this area, and a vibration dampener comprising a spiral monoplanar spring mounted within a cup-shaped support fixed to the inner surface of the outer shell at a plurality of point contacts, the inner coil of said spring embracing said stud in line contact to provide resilient retention of the inner shell in spaced relation with the outer shell.

References Cited in the file of this patent

UNITED STATES PATENTS

| | | |
|---|---|---|
| 1,478,711 | Hastedt | Dec. 25, 1923 |
| 1,521,148 | Dennett et al. | Dec. 30, 1924 |
| 1,561,101 | Mott et al. | Nov. 10, 1925 |
| 1,607,071 | Gleason | Nov. 16, 1926 |
| 1,716,622 | Cohen | June 11, 1929 |
| 2,329,765 | Jackson et al. | Sept. 21, 1943 |
| 2,643,022 | Cornell | June 23, 1953 |